(No Model.) 2 Sheets—Sheet 1.

C. S. & M. A. GURNEY.
ROAD CART.

No. 535,986. Patented Mar. 19, 1895.

Witnesses
Geo. C. Shoemaker
H. F. Riley

Inventors
Charles S. Gurney and
Miron A. Gurney.
By their Attorneys.
C. A. Snow & Co.

THE NORRIS PETERS CO., PHOTO-LITHO., WASHINGTON, D. C.

(No Model.) 2 Sheets—Sheet 2.

C. S. & M. A. GURNEY.
ROAD CART.

No. 535,986. Patented Mar. 19, 1895.

Witnesses
Geo. C. Shoemaker
J. F. Riley

Inventors
Charles S. Gurney and
Miron A. Gurney.
By their Attorneys.
C. A. Snow & Co.

UNITED STATES PATENT OFFICE.

CHARLES S. GURNEY AND MIRON A. GURNEY, OF SOUTH WAREHAM, MASSACHUSETTS.

ROAD-CART.

SPECIFICATION forming part of Letters Patent No. 535,986, dated March 19, 1895.

Application filed July 30, 1894. Serial No. 518,948. (No model.)

*To all whom it may concern:*

Be it known that we, CHARLES S. GURNEY and MIRON A. GURNEY, citizens of the United States, residing at South Wareham, in the county of Plymouth and State of Massachusetts, have invented a new and useful Road-Cart, of which the following is a specification.

The invention relates to improvements in road carts.

The object of the present invention is to improve the construction of road carts, to prevent horse motion from being communicated to the body of the cart, to enable any form of body and springs to be employed similar to those used in four wheeled vehicles, and to enable the road cart to be entered conveniently in advance of the wheels.

A further object of the invention, is to enable the shafts to be adjusted in height to suit different sizes of horses, and to balance the weight of the body of the cart over the axle, to prevent pressure on the draft animal, and to avoid any liability of the body tiping forward or rearward in event of the breakage of a spring, or the like.

The invention consists in the construction and novel combination and arrangement of parts hereinafter fully described, illustrated in the accompanying drawings, and pointed out in the claims hereto appended.

Figure 1:
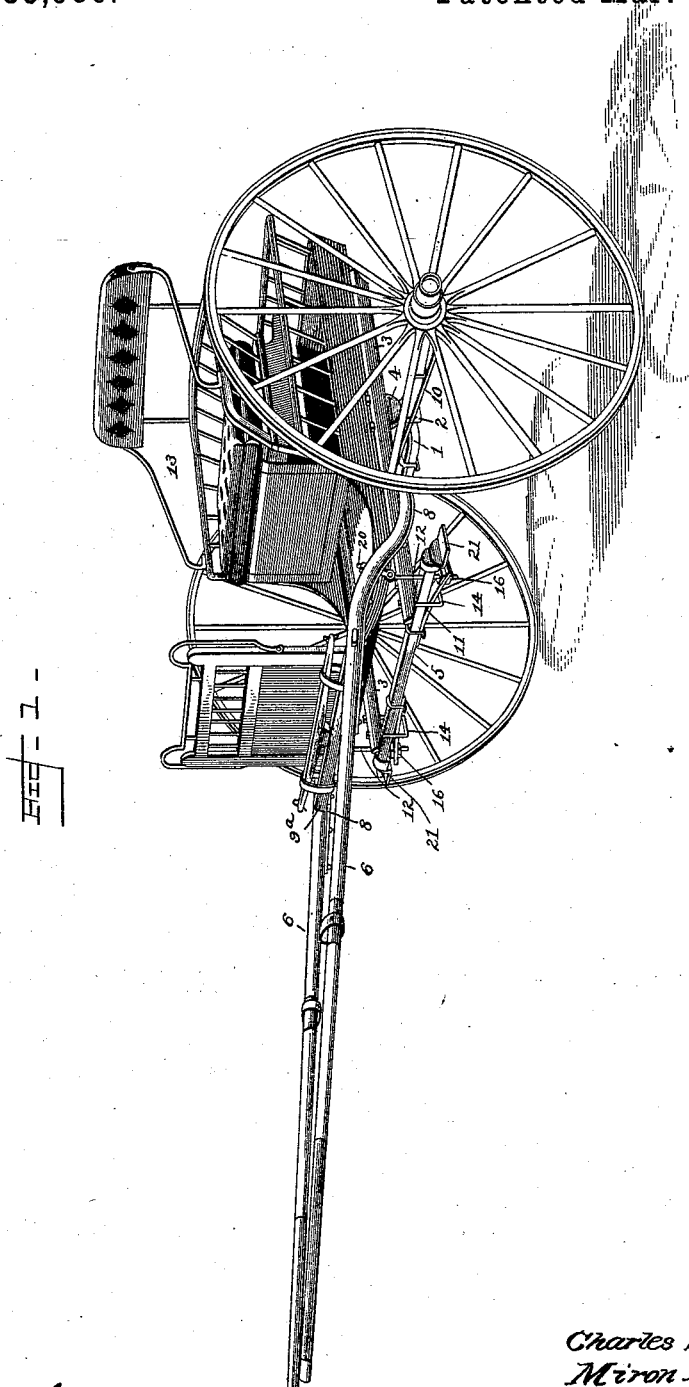
Figure 2:
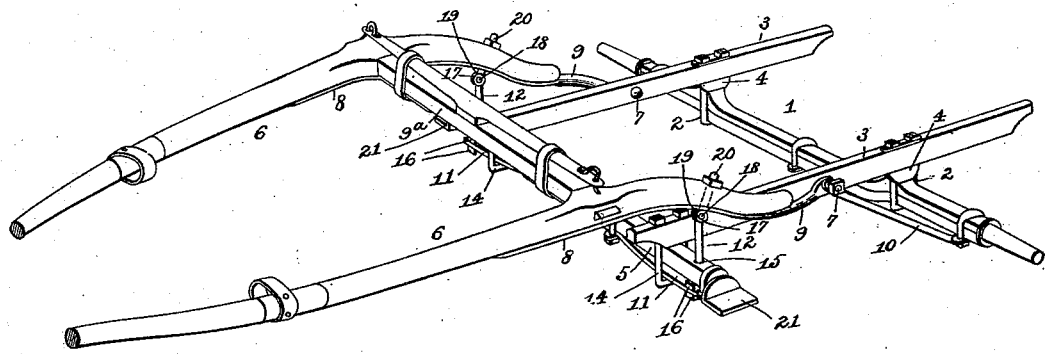
Figure 3:
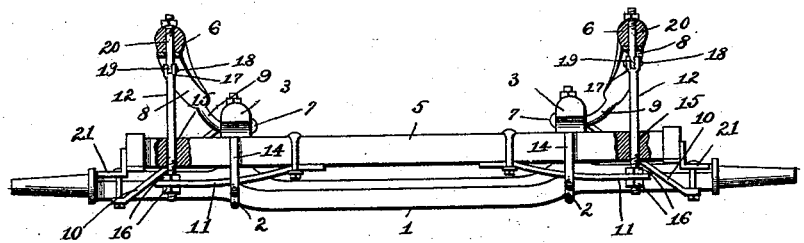

In the drawings—Figure 1 is a perspective view of a road cart constructed in accordance with this invention. Fig. 2 is a similar view, the cart body and wheels being removed. Fig. 3 is a transverse sectional view of the same.

Like numerals of reference indicate corresponding parts in all the figures of the drawings.

1 designates an axle, to which is secured, by inverted clips 2, side bars 3, which project forward and rearward from the axle, and which have blocks 4 interposed between them and the axle, the inverted clips receiving the axle, and extended upward through the blocks and the side bars, and provided with nuts located on the upper faces of the latter.

The front terminals of the side bars 3 are connected by, and secured to, a cross-bar 5, extended laterally beyond the side bars and having shafts 6, yieldingly connected with the laterally extending ends. The shafts 6 are pivotally connected by bolts 7 to the outer faces of the side bars 3 at points intermediate of the ends thereof, and in advance of the axle; and the shaft irons 8 are provided with inwardly and rearwardly curved extensions or bars 9, terminating at their rear ends in eyes to receive the bolts 7. The shaft irons are extended forwardly along the lower faces of the shafts, and are provided, adjacent to the cross bar 9ª with inward extensions located below the latter. The side-bars are supported by forwardly and upwardly extending braces 10 clipped at their rear ends to the lower face of the axle, and connected at their upper terminals to the side bars by the bolts 7, which pivot the extensions of the shaft irons to the same.

Transversely disposed springs 11 are secured at their inner ends to the lower face of the cross-bar 5, and have their outer terminals adjustably connected with and supporting the shafts by bolts or screws 12, whereby the shafts are free to yield to the motion of the horse without communicating such motion to the body 13. The springs 11 are limited in their vibrations by rectangular frames or keepers 14 secured to the sides of the cross-bar 5 and depending therefrom. The adjusting bolts or screws 12 pass loosely through perforations 15, of the extended ends of the cross-bar 5, and through perforations of the springs, and have arranged on them nuts 16, located above and below the springs, whereby the shafts are capable of vertical adjustment to arrange them at the proper height to accommodate different sizes of horses. The upper ends of the adjusting screws are bifurcated at 17, and are pivoted by rivets or bolts 18 to the reduced ends 19 of bolts 20, which pass through and are secured to the shafts; and this manner of pivoting forms a knuckle joint, which facilitates free movement of the shafts.

Any desired form of body 13 may be employed, and any desired form of spring for mounting the body on the side bars 3 may be used, and it will be apparent that the arrangement of the side bars 3, the cross-bar 5, and the axle permit the construction of bodies used on four wheeled vehicles to be employed, and the supporting springs of the body may be arranged in the same manner, which is a great advantage, as it enables a roomy body to be employed, and enables a considerable amount of luggage to be conveniently carried.

Steps 21 are secured to the outer terminals of the side bar 5, and they are arranged to permit the vehicle to be entered in advance of the wheel.

It will be seen that the road cart is simple and comparatively inexpensive in construction, that it prevents horse motion from being communicated to the body, and that the form of body employed on four wheeled vehicles may be used. It will also be seen that the body is equally balanced over the axle, to prevent any unnecessary weight on the draft animal, and that the shafts may be raised and lowered to suit the size of the horse to be used. Furthermore it will be readily understood that the particular arrangement of the springs 11 and their connections with the cross-bar 5 and the shafts prevent any liability of the body pitching rearward or forward, in event of the breakage of them.

Changes in the form, proportion, and the minor details of construction may be resorted to without departing from the principle or sacrificing any of the advantages of this invention.

What we claim is—

1. In a road cart, the combination of an axle, side-bars rigidly mounted thereon and extending forward and rearward therefrom, a cross-bar connecting the front ends of the side-bars and projecting laterally therefrom, shafts pivotally connected to the side bars in advance of the axle and located above the extended ends of the cross-bar, springs arranged on the lower face of the cross-bar, and adjusting bolts passing loosely through the ends of the cross-bar and hingedly connected to the shafts and adjustably secured to the springs, substantially as described.

2. In a road cart, the combination of an axle, the rigidly mounted side-bars extending forward and rearward therefrom, a cross-bar connecting the front ends of the side bars and projecting laterally therefrom, a spring supported body mounted on the side bars, thills pivotally connected to the side bars in advance of the axle, springs secured to the lower face of the cross-bar, adjusting bolts hingedly connected at their upper ends to the thills and passing loosely through the cross-bar and through the ends of the springs, nuts arranged on the bolts and located above and below the springs, and keepers depending from the cross-bar and receiving the spring, substantially as described.

In testimony that we claim the foregoing as our own we have hereto affixed our signatures in the presence of two witnesses.

CHARLES S. GURNEY.
MIRON A. GURNEY.

Witnesses:
IRA HATHAWAY,
ISAAC W. SMALL.